United States Patent [19]

Johnson et al.

[11] Patent Number: 4,781,416
[45] Date of Patent: Nov. 1, 1988

[54] SEATBACK RECLINER

[75] Inventors: Richard F. Johnson, Bloomfield Hills; James D. Held, Utica, both of Mich.; Elaine S. Schultz, Troy; Olivier Lecerf, Farmington Hills, all of Mich.

[73] Assignee: Semec, Inc., Troy, Mich.

[21] Appl. No.: 906,732

[22] Filed: Sep. 11, 1986

[51] Int. Cl.⁴ .............................................. A47C 1/25
[52] U.S. Cl. ...................................... 297/362; 74/805
[58] Field of Search .................... 74/804, 805; 297/362

[56] References Cited

U.S. PATENT DOCUMENTS

| | | | |
|---|---|---|---|
| 3,738,194 | 6/1973 | Lorence | 74/805 |
| 3,939,737 | 2/1976 | Horvath | 74/805 |
| 4,196,931 | 4/1980 | Werner | 297/362 |
| 4,200,333 | 4/1980 | Cremer et al. | 297/362 |
| 4,225,182 | 9/1980 | Werner | 74/805 X |
| 4,302,047 | 11/1981 | Esser | 297/362 |
| 4,366,983 | 1/1983 | Klueting et al. | 297/362 |
| 4,457,556 | 7/1984 | Klingelhöfer | 74/805 X |
| 4,469,375 | 9/1984 | Boyer | 297/362 |
| 4,505,515 | 3/1985 | Wilking et al. | 74/805 X |

Primary Examiner—Peter A. Aschenbrenner
Attorney, Agent, or Firm—Cullen, Sloman, Cantor, Grauer, Scott & Rutherford

[57] ABSTRACT

A powered hinge for adjusting the position of inclination of a vehicle's seatbacks has a planetary gear train in which are fixed to the vehicle a pair of bifurcated internal gears between which is coaxially supported for relative bidirectional rotation a driven internal gear attached to the seatback and driven by the second of a pair of compounded external gears, the first of which is bifurcated axially and disposed on either side of the second to form a satellite which is driven eccentrically with rolling, planetary motion within the fixed pair of internal gears by means of an eccentric cam rotated bidirectionally by, e.g., a shaft driven by an electric motor. The gearing, in which the number of teeth in corresponding external and internal gear pairs differs by only about one tooth, permits extremely large gear train values to be achieved within a very compact package and the use of relatively low-torque electric motors.

6 Claims, 4 Drawing Sheets

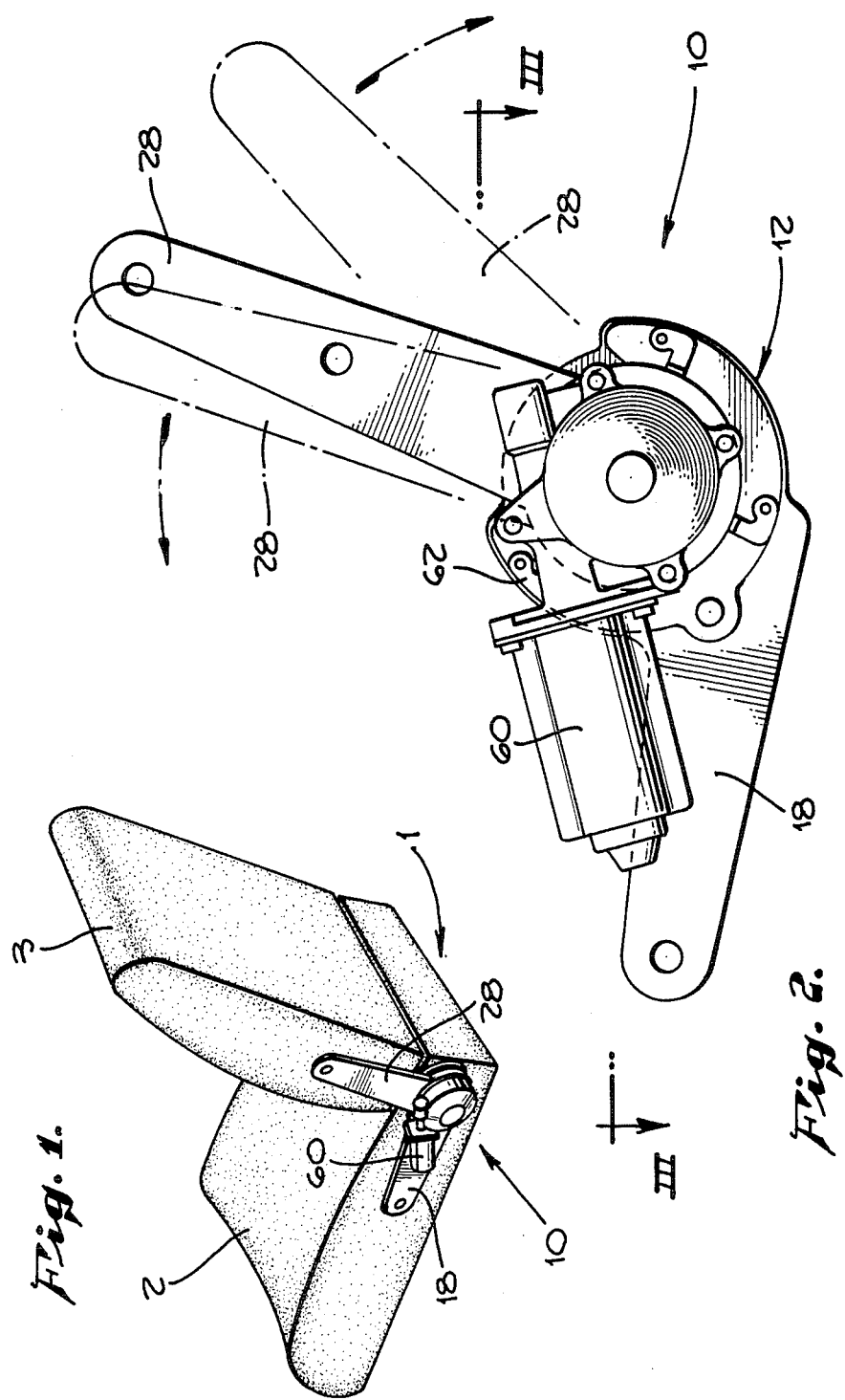

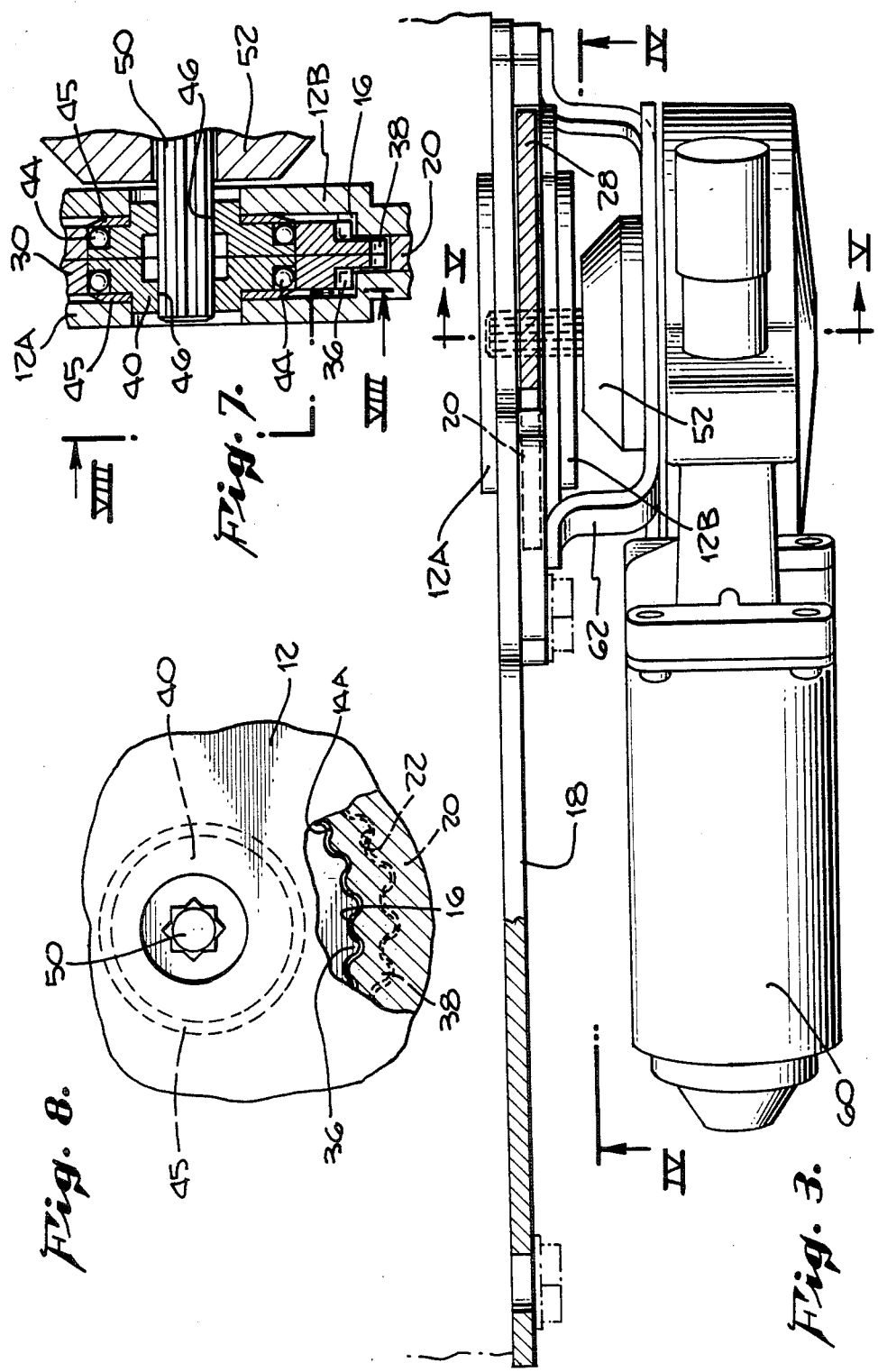

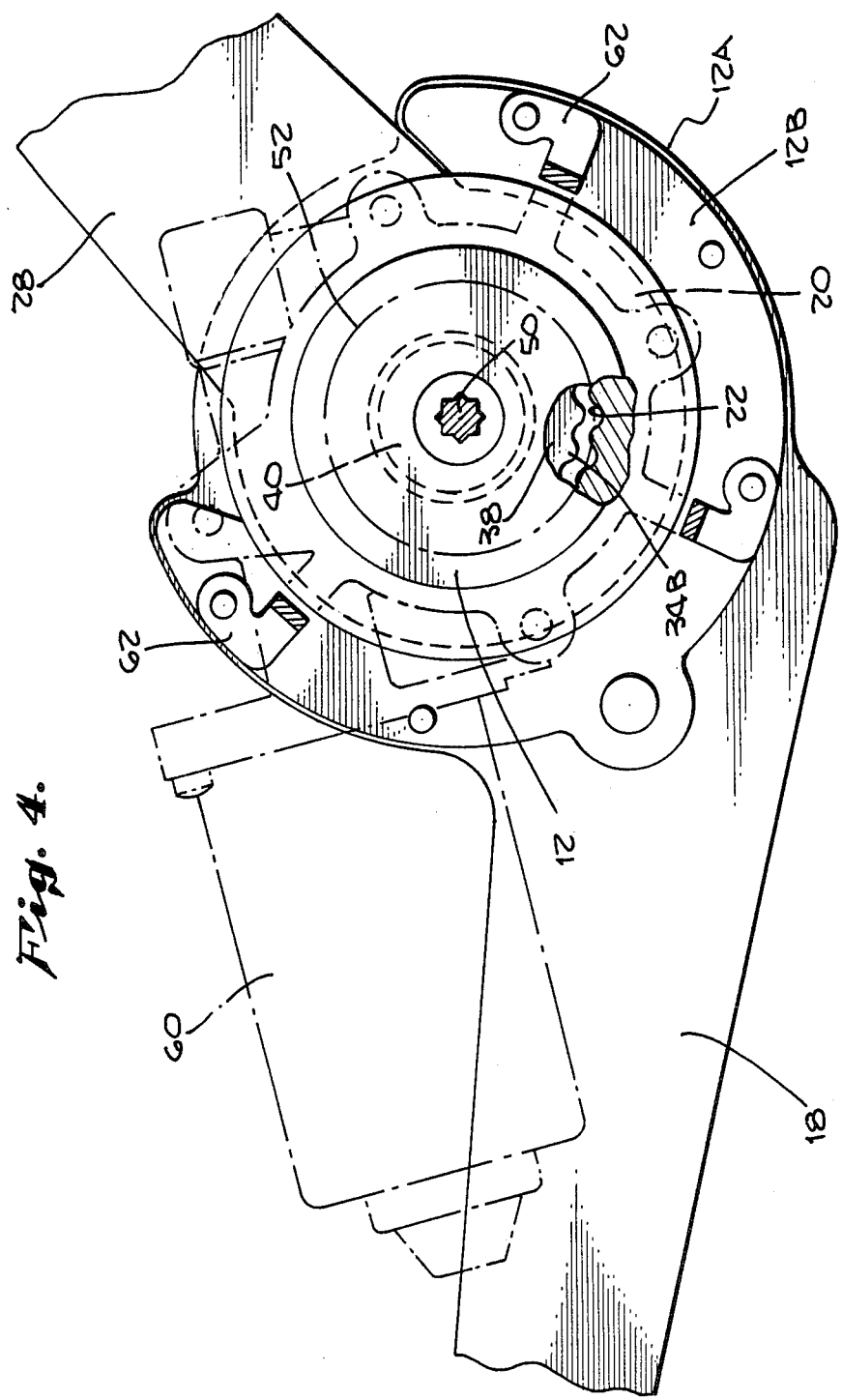

SEATBACK RECLINER

BACKGROUND OF THE INVENTION

1. Field of the Invention

This invention pertains, in general, to automotive hardware and the like, and in particular, to a power recliner for vehicle seatbacks.

2. Description of Related Art

Recent-vintage automobiles are frequently equipped with individual seats in which the seatback is adjustably-reclinable by the occupant for riding comfort. Typically, these seats have the backrest attached to the seat by a hinging mechanism which incorporates, or operates in conjunction with, a hand-actuated lever having a dog for engaging one of a plurality of teeth on a semicircular rack, with which the position of the seatback may be adjusted manually by the occupant.

Other seatback reclining mechanisms may employ a gear train in which some mechanical advantage is afforded to the user during the adjustment procedure. One such apparatus which has relevance to the instant invention is the "Hinge Mount" disclosed by Esser in U.S. Pat. Ser. No. 302,047, which includes a "wobble gear adjuster" having an outer gear integrally formed on a hinged mount secured to the seat proper and an inner gear integrally formed on a hinged mount secured to the reclinable backrest and a handle-driven eccentric cam for driving the external gear within the internal gear in a relatively-compact package.

Mechanisms employing other kinds of gear trains for mechanical advantage are known, but the precision machining requirements necessary to incorporate them reliably within a compact package often render them prohibitively expensive. This requirement for compactness also often results in gear trains having relatively low velocity ratios, which necessitate their use in parallel-driven pairs at the hinge points of the seat and/or preclude their use in practical power-driven applications because of high-input-torque requirements.

It is therefore an object of the present invention to provide a seatback recliner mechanism which achieves a high gear train value and static load capability within a very compact package. It is a further object of the present invention to provide such a mechanism which can be operated smoothly with either a manually-adjusted handle or a relatively low-output-torque electric motor which, in turn, may be located remotely from the apparatus itself. It is still a further object of the present invention to provide such a mechanism which is relatively inexpensive to fabricate in mass production, yet which is safe and reliable in operation and capable of withstanding the rigors of hard, continual use.

SUMMARY OF THE INVENTION

These and other objects of the present invention are preferably accomplished by the provision, in a vehicle equipped with seats having reclining backrests, of a power hinge for adjusting their position of inclination, comprising a planetary gear train, which includes a fixed internal gear attached to the seat, a driven internal gear attached to the backrest supported by the fixed internal gear for relative coaxial rotation, a compound satellite having a pair of external gears, one being driven eccentrically with rolling contact within the fixed internal gear, the other driving the driven internal gear with rolling engagement, wherein the internal gears have at least one more tooth than the corresponding internal gear engaging them, a driver having one end pinioned at the center of the external gears, with the satellite pinioned at the other, and a throw equal to the eccentricity of the driven external gear, and a handle or reversible motor fixed to the seat and coupled to the driver for selectively rotating the driver bidirectionally.

These and other objects and advantages of the present invention will be more readily understood by the skilled practitioner from a consideration of the following detailed description of the preferred embodiments, when read in conjunction with the appended drawings, a brief description of which now follows:

BRIEF DESCRIPTION OF THE DRAWINGS

FIG. 1 is a rear, side perspective view of a vehicle seat having a bottom part and a backrest with an exemplary preferred embodiment of the mechanism of the present invention connecting the two parts of the seat together;

FIG. 2 is a side view of the mechanism wherein the Section III—III is taken;

FIG. 3 is a partial sectional view into the top of the mechanism, as revealed by the Section III—III taken in FIG. 2;

FIG. 4 is a partial sectional view into the opposite side of the mechanism from that depicted in FIG. 2, as revealed by the Section IV—IV taken in FIG. 3;

FIG. 7 is a partial sectional view looking into the rear of the mechanism; and

FIG. 8 is a partial sectional view through the side of the mechanism, showing the teeth of the gears in meshing engagement, as revealed by the Section VIII—VIII taken in FIG. 7.

DESCRIPTION OF THE PREFERRED EMBODIMENT

Figure 5:
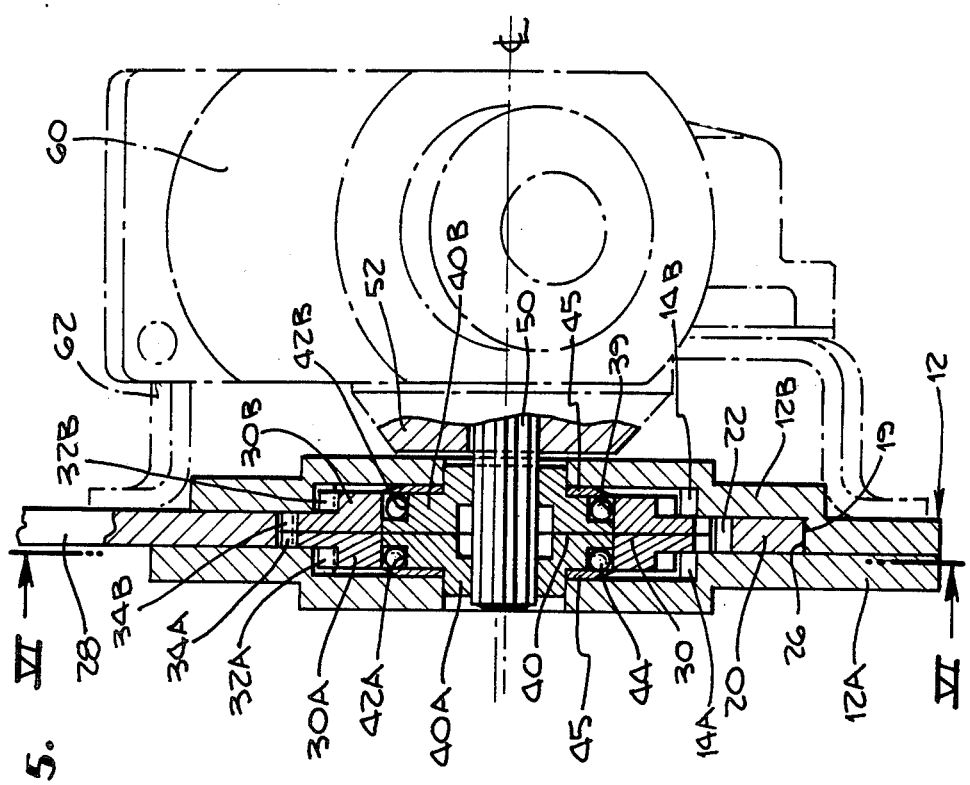
FIG. 5 is a partial sectional view looking into the front of the mechanism, as revealed by the Section V—V taken in FIG. 3.
Figure 6:
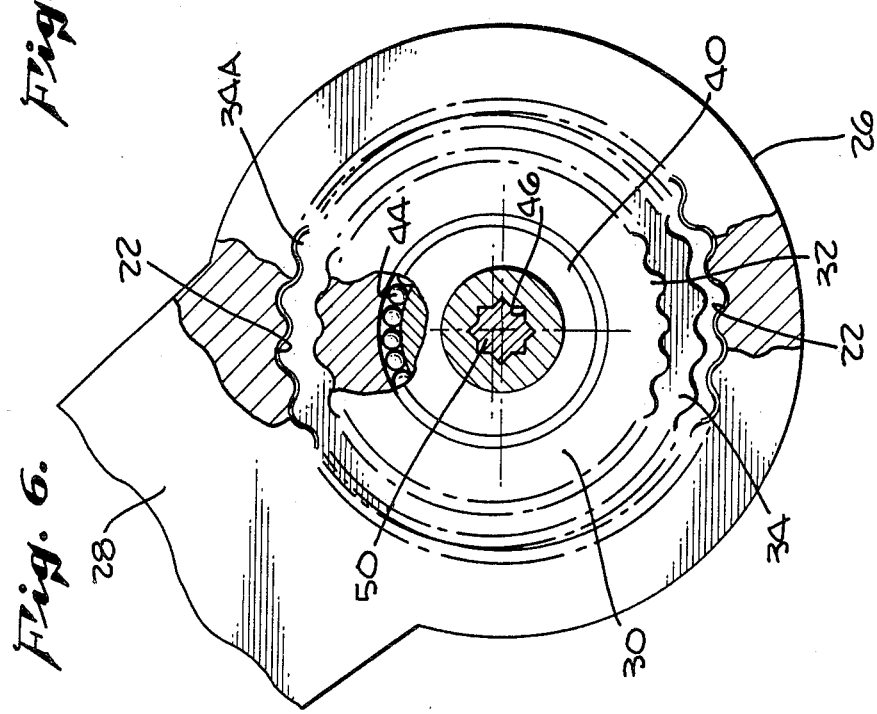
FIG. 6 is a partial sectional view into the side of the mechanism, as revealed by the Section VI—VI taken in FIG. 5.

An exemplary, preferred embodiment of the apparatus 10 is illustrated generally in FIG. 1 in use in conjunction with a typical automobile seat 1 comprising a bottom or seat part 2 and a bracket part 3 hingeably attached to seat part 2 by means of the apparatus 10.

In general terms, the apparatus 10 may be thought to comprise a planetary gear train, including a fixed part 12 containing a first, or fixed, internal gear 14 fixed firmly to seat part 12 and a moving part 20 containing a second, or driven, internal gear 22 supported by fixed part 12 for relative coaxial rotation of gears 14 and 22 attached to backrest part 3.

A compound satellite 30 containing a first, or driven, external gear 32 and a second, or driving, external gear 34 is driven eccentrically within the pair of internal gears with planetary motion such that rolling meshing occurs between the respective, mating pairs of gears by means of a cam, or keyed eccentric 40 assembled upon, and driven by, a splined shaft 50 which, in the exemplary preferred embodiment illustrated, may be driven selectively with rotational movement in either direction by means of an electric motor and worm gear assembly 60.

In the embodiment illustrated (see FIG. 5), fixed part 12 comprises an inner part 12A and an outer part 12B which are spaced apart by about the width of moving part 20. Each fixed part contains a pair of first internal gears 14A and 14B, respectively, whose tooth forms, or profiles, are stamped or coined into their respective fixed parts. Each of the fixed pair of internal gears 14A and 14B contains an integer number $N_1$ of concave, semicircular teeth 16 about its inner periphery. In addition, inner fixed part 12A includes an extension in the form of an arm 18 which is attached firmly along the side of bottom part 2 of seat 1 by a plurality of fastener means, such as bolts.

In addition to being formed to contain the fixed internal gear profiles 14A and 14B discussed above, one, the other, or both of fixed parts 12A and 12B are also formed to include a semicylindrical portion disposed radially thereon to form a semicylindrical, generally radially-inward-facing bearing surface 19 when inner and outer fixed parts 12B and 12A are fastened together by fastener means, such as a plurality of sturdy rivets.

Clamped between fixed parts 12A and 12B for relative coaxial rotation is moving part 20 which is similarly die-stamped or coined to include the second, or driven, internal gear 22, which comprises an integer number $N_4$ of concave, semicylindrical internal teeth 24. The second, or driven, internal gear 22 is supported for relative coaxial rotation between fixed internal gears 14A and 14B by means of a semicylindrical portion disposed radially on the outer periphery of moving part 20 to form a semicylindrical bearing surface 26 in contact with, and supported by, semicylindrical bearing surface 19. Practioners of the art will recognize that the disposition of moving part 20 between fixed parts 12A and 12B might desirably be reversed by bifurcating moving parts 20 into a pair of arms, each containing one of a pair of driven, internal gears 22 supported for coaxial rotation by a single fixed part 12 containing a single internal gear 14 fixed to seat part 2, should the application warrant it.

Supported eccentrically within internal gears 14 and 22 is satellite 30 (see FIGS. 5, 6, 7 and 8). Satellite 30 includes a pair of annular-shaped external gear profiles 32 and 34 stamped or formed into its external periphery to form a compound gear. The first, or driven, external gear 32 contains an integer number $N_2$ of convex, semicircular teeth 36 formed radially thereon, which teeth are conjugate with those of internal gear 14 and are less in number by at least 1 than the number $N_1$ of teeth 16 contained in that gear. Similarly, the second, or driving, external gear 34 on the outer periphery of satellite 30 is die-stamped or coined to include an integer number $N_3$ of convex, semi-circular teeth 38 which are conjugate with those of internal gear 22 and which are less in number than the number $N_4$ of teeth 24 on that gear by at least one tooth.

The pitch radii of external gears 32 and 34 are constrained to be less than that of corresponding, meshing, internal gears 14 and 22, respectively by a constant amount, which amount corresponds to the eccentricity at which satellite 30 is driven within internal gear 14 and at which satellite 30 drives internal gear 22 by means of eccentric 40.

In the exemplary embodiment illustrated in the figures, satellite 30 is shown to be comprised of a pair of substantially identical pairs 30A and 30B of concentric, external gears compounded back-to-back such that the intermediate, or second, external gear 34 is formed in halves 34A and 34B from each of the satellite pair 30A and 30B with a concentric, substantially-identical pair of the first external gears 32A and 32B on either side thereof. This form of construction has been shown to achieve a reduction in fabrication costs. However, skilled practitioners will recognize that satellite 30 might easily be formed as a single part, or for that matter, a pair of first external gears 32A and 32B with a single, second external gear 34 compounded coaxially therebetween.

Likewise, the skilled practitioner will recognize that, although semi-circular profiles have been shown for the teeth of the respective internal and external gears, other tooth profiles, such as conventional involute or cycloidal tooth profiles might as easily be utilized, the most important requirement being that the respective internal and external gear pairs mesh with generally rolling contact, without a large amount of friction, and without interference occurring. In this latter regard, it is to be noted that, particularly when the respective pitch radii of the external gears begins to approach that of their respective, meshing internal gears, i.e., when respective meshing pairs differ in number of teeth by about only one tooth, especial care must be given to the control over addenda and dedenda of the teeth, and perhaps to undercutting, to avoid interference or fouling between pairs of teeth not in driving engagement.

In the embodiment illustrated, satellite 30 is driven eccentrically by means of a cam, or eccentric 40. Eccentric 40 is simply an expansion of an arm, or crank, having one end pinioned at the center of the external gears, a second end attached for rotational movement to the center of satellite 30, and a throw, or length, equal to the eccentricity of satellite 30. When external and internal gear pairs are constrained to differ by only a few teeth, e.g., one tooth, then the eccentricity becomes extremely small and it becomes desirable to substitute the eccentric 40 illustrated. Eccentric 40 has a center concentric with that of satellite 30 and a center of rotation concentric with that of the pair of internal gears 14 and 22. In the embodiment illustrated, eccentric 40 is formed, for ease of machining purposes, from a pair of symmetrical pairs of 40A and 40B splined back-to-back on splined shaft 50. Satellite 30 contains a cylindrical opening through it to form an annular bearing surface 39 to receive eccentric 40 for relative sliding rotation. Each symmetrical eccentric half 40A and 40B contains a radially-disposed shoulder 42A and 42B, respectively, which, together with bearing surface 39, form an annular-shaped raceway within which friction-reducing means, such as a plurality of ball bearings 44 are disposed for smooth, rolling action. Ball bearings 44 are retained in place by means of a pair of axially-spaced keepers 45. A splined keyway 46 is formed axially through eccentric 40 to permit it to be assembled in symmetrical halves upon shaft 50 and to be driven rotationally thereby. Shaft 50 is rotationally-coupled to gear motor assembly 62 by means of adaptor 52 and gear-motor assembly 62 is mounted to device 10 by means of a spider frame 62.

It can be shown by conventional gear analysis techniques that an apparatus 10 in accordance with the present invention will have a gear train value, or velocity ratio, equal to about $N_2N_4/(N_2N_4-N_1N_3)$. Thus, in the exemplary embodiment illustrated, first and second internal gears 14 and 22 contain 20 and 25 teeth respectively, whereas first and second external gears 32 and 34 contain 19 and 24 gears, respectively, which results in a gear train value for apparatus 10 of about −95, i.e., each revolution of eccentric 40 in one direction will result in a rotation of moving part 20 through an arc of about 3.8 degrees in the opposite direction. In the embodiment illustrated, seatback 3 is designed to have a full range of motion of about 30 degrees from a fully-reclined position to a fullyinclined position. This range may be fully traversed in about eight revolutions of shaft 50 in either direction.

This gear train value also results in a high static load capability and permits the use of apparatus 10 with a wide variety of low-output torque electric motors, such as the electric worm-gear motor 62 illustrated, which is of a type conventionally used to drive electric power windows. Skilled practitioners will recognize that the apparatus lends itself well to other types of motors and transmission means as well, such as a cogged belt used in conjunction with a pair of pulleys, or a flexible shaft arrangement used in combination with a bi-directional electric motor, which may then be located remotely from apparatus 10 to clear surrounding structures.

The resulting apparatus 10, exclusive of attachment arms 18 and 28 and gear-motor 60 occupies a cylindrical volume of only about 10 centimeters in diameter by about 1.75 centimeters thick. This compact size lends apparatus 10 well to single-sided applications in vehicle interiors, such as automobiles, in which it may be incorporated as illustrated on one or the other side of the seat assembly, or it may be compounded in pairs on either side of the seat onto a common driving shaft 50.

Similarly, skilled practitioners will recognize that the gear train value of the apparatus 10 may be easily modified one way or the other over a relatively large range by varying the number of teeth, and hence, the pitch radii, of the respective engaging internal and external gear pairs, without adversely affecting the compact size of the device. Accordingly, in budget installations, a manually-adjustable apparatus 10 may be easily achieved by the elimination of the electric motor and transmission means altogether, and their replacement by a simple knob or handle coupled to the outer end of shaft 50.

In the embodiment illustrated, the parts are inexpensively stamped from mild steel, which is subsequently heat treated for stength and riveted together before assembly to the seat. However, other materials, methods of fabrication, and assembly will recommend themselves to skilled practitioners, depending upon the particular application at hand. Accordingly, the scope and spirit of the instant invention should be limited only by the claims appended hereafter.

What is claimed is:

1. A power recliner for a seat having an adjustable backrest, comprising:

a pair of concentric internal gears, the first having an integer number $N_1$ of teeth and being fixed to said seat, the second having an integer number $N_4$ of teeth and being fixed to said backrest for rotation relative to said seat;

a pair of concentric external gears compounded back-to-back to form a satellite, the first of said external gears having an integer number $N_2$ of teeth conjugate with those of said first internal gear, where $N_1 - N_2 \geq 1$, the second of said external gears having an integer number $N_3$ of teeth conjugate with those of said second internal gear, where $N_4 - N_3 \geq b\ 1$, and wherein the difference in pitch radii between said pairs of first and second internal and external gears, respectively, is about equal to a given, constant amount defined as the eccentricity of said satellite; and driver means for driving said satellite at said eccentricity within said first internal gear with planetary motion, the profiles of said teeth of said gears being contoured for generally rolling, meshing contact without interference, whereby said second internal gear is driven with a velocity ratio of about $N_2N_4/(N_2N_4 - N_1N_3)$;

said first internal gear further comprises a pair of substantially identical, coaxial internal gears spaced apart axially by about the width of said second internal gear, wherein one, the other, or both of said identical pair has a semicylindrical portion disposed radially thereon to form an upward-facing, semicylindrical bearing surface to support said second internal gear therein;

said second internal gear having a semicylindrical portion disposed radially thereon and journaled within said semicylindrical bearing surface to support said second internal gear for relative concentric rotation therebetween;

said first external gear further comprises a pair of substantially identical, coaxial internal gears spaced apart axially by about the width of said second external gear, with said second external gear being disposed intermediately therebetween, each said gear in said identical external pair engaging one of said gears in said identical internal pair;

said second internal gear further comprises a pair of substantially identical, coaxial internal gears spaced apart axially by about the width of said first internal gear, wherein one, the other, or both of said identical pair has a semicylindrical portion disposed radially thereon to form an downward-facing, semicylindrical bearing surface supported by said first internal gear, said first internal gear having a semicylindrical portion disposed radially thereon and journaled within said semicylindrical bearing surface to support said second identical pair for concentric rotation thereabout;

said second external gear further comprises a pair of substantially identical, coaxial internal gears spaced apart axially by about the width of said first external gear, with said first external gear being disposed intermediately therebetween, each said gear in said identical external pair engaging one of said gears in said identical internal pair;

a cylindrical eccentric cam having a center coaxial with said satellite and a center of rotation coaxial with said internal gears, said satellite having a cylindrical opening therethrough forming an annular bearing surface to receive said cam for relative sliding rotation therein; and means for selectively driving said cam bidirectionally about said center of rotation.

2. The apparatus of claim 1, wherein said satellite further comprises:

a pair of substantially identical pairs of concentric external gears compounded back-to-back such that said intermediate gear is formed in halves from each said pair.

3. The apparatus of claim 1, wherein said means for driving said cam comprises:

a knob or handle attached to said cam for driving said cam manually.

4. The apparatus of claim 1, wherein said means for driving said cam further comprises:
- an electric motor capable of supplying a bidirectional turning moment; and
- transmission means for transmitting said turning moment to said cam.

5. In a vehicle equipped with a seat having a reclining backrest, a power hinge for adjusting the position of said backrest, comprising:
- a planetary gear train, including:
- a fixed internal gear attached to said seat;
- a driven internal gear attached to said backrest and supported by said fixed internal gear for coaxial rotation relative thereto;
- a compound satellite comprising a pair of external gears, one being driven eccentrically with rolling engagement within said fixed internal gear, the other driving said driven internal gear with rolling engagement, each said external gear having at least one less tooth than its respective engaging internal gear; and
- a driver arm having one end pinioned at the center of said external gears with said satellite pinioned at the other, and a throw about equal to the eccentricity of said driven external gear; and
- a reversible motor fixed to said seat and rotationally coupled to said driver for selectively rotating said driver bidirectionally;
- said driver arm further comprises a cylindrical eccentric cam having a center coaxial with said satellite and a center of rotation coaxial with said internal gears, said satellite having a cylindrical opening therethrough forming an annular bearing surface to receive said cam for relative sliding rotation therein;
- said fixed internal gear is bifurcated axially into a pair of spaced internal gears between which said driven internal gear is supported for relative coaxial rotation; and
- said driven external gear is axially bifurcated into a pair of spaced internal gears between which said driving external gear is fixed for coaxial co-rotation therewith.

6. The apparatus of claim 5, wherein:
- said fixed internal gear has about 20 teeth, said driven internal gear has about 25 teeth, said driven external gear has about 19 teeth, and said driving external gear has about 24 teeth.

* * * * *